March 7, 1961 R. M. DOWNING ET AL 2,973,552
APPARATUS FOR WIRE MANUFACTURE
Filed Feb. 29, 1956
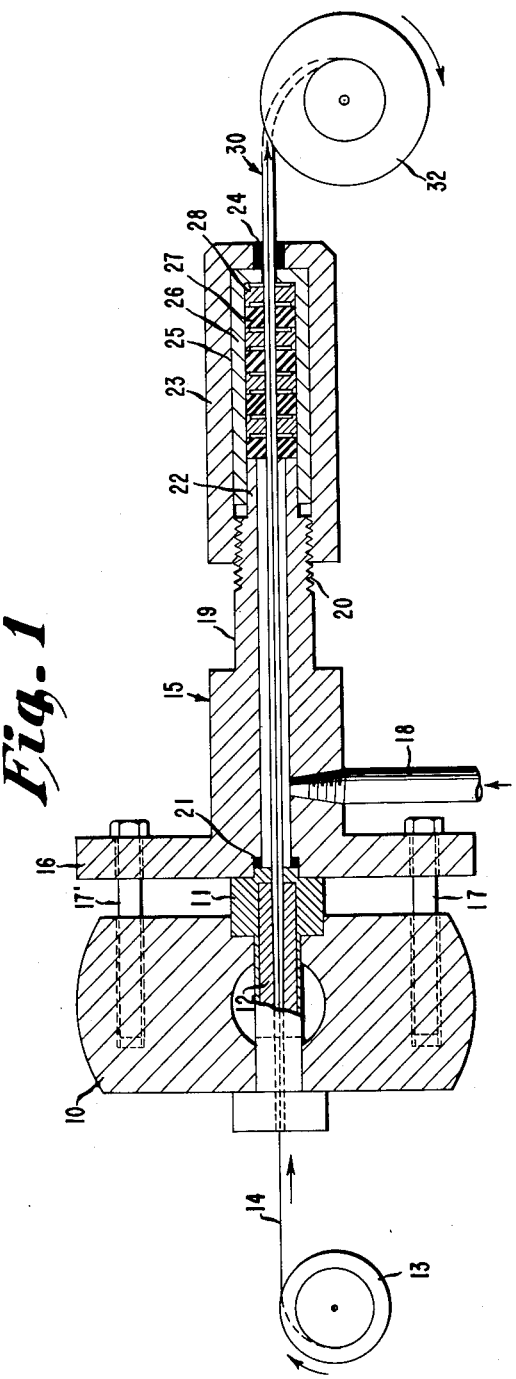
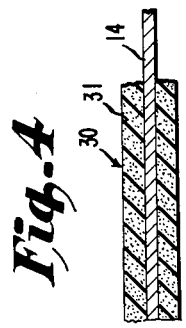
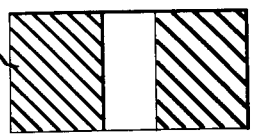
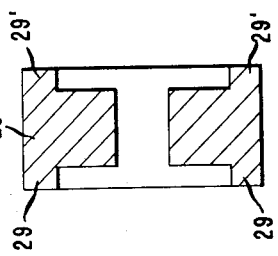
INVENTORS
RICHARD M. DOWNING
LOUIS T. STAATS, JR.
NATHANIEL C. WYETH
BY Jules H. Steinberg
ATTORNEY – # United States Patent Office 2,973,552
Patented Mar. 7, 1961

2,973,552
APPARATUS FOR WIRE MANUFACTURE

Richard M. Downing, Woodstown, N.J., Louis T. Staats, Jr., Lewisville, Pa., and Nathaniel C. Wyeth, Hockessin, Del., assignors to E. I. du Pont de Nemours and Company, Wilmington, Del., a corporation of Delaware Filed Feb. 29, 1956, Ser. No. 568,599

3 Claims. (Cl. 18—13)

The present invention relates to a novel apparatus for the production of insulated electrical conductors. More particularly, the present invention pertains to an apparatus for the manufacture of electric wire having a coating of insulation which consists primarily of an expanded cellular plastic composition, especially expanded cellular polyvinylchloride.

In the field of insulated electrical wire, the prior art discloses numerous compositions which have been used for insulation purposes. These include a wide variety of inorganic and organic substances. Organic elastomers and resins have proven to be particularly suitable and convenient in many respects. The utility of the elastomers and resins in this connection would be significantly enhanced if it were possible to materially lower the cost of such insulation per unit of insulated wire.

It is an object of the present invention to provide an apparatus for the production of an electrical conductor or wire with a coating of insulation which is cheap and which has suitable dielectric and mechanical properties. It is a further object of the present invention to provide an apparatus for applying to a wire such a coating of insulation, particularly of polyvinylchloride, in a form having superior insulating properties with a minimum of the plastic material. These and other objects will become apparent from a consideration of the following specification and claims.

The invention resides in a novel apparatus to be used in conjunction with a conventional extruding device for applying an expanded cellular polyvinylchloride or other plastic coating to an electric wire. The nature of this insulated wire thus obtained and the apparatus for producing it will be more readily understood by consideration of the following detailed description thereof and the accompanying drawing in which:

Figure 1 represents a cross-sectional view of a typical embodiment of the apparatus of the present invention;

Figures 2 and 3 represent enlarged cross-sectional views of certain components of a seal utilized in the apparatus of Figure 1; and Figure 4 represents a view partly in cross section of the product produced by the apparatus of the present invention, viz., an electrical wire having a coating of expanded cellular polyvinylchloride.

Cellular plastic materials have been used for years in a wide variety of products for home and industry. Cellular plastics, for example, cellular polyvinylchloride, are prepared by foaming a mixture consisting primarily of the resin and a suitable plasticizer therefor. The polyvinylchloride mixture may contain in addition any of a variety of additives such as antioxidants, stabilizers, fillers, lubricants, pigments, or the like, all with a view to providing the cellular product with specific physical properties. The foaming may be accomplished mechanically by the use of gas under pressure, or it may be accomplished chemically by the use of a chemical blowing agent which decomposes upon heating to release a gas. A typical technique for expanding polyvinylchloride and similar thermoplastic resins by the use of chemical blowing agents is disclosed in U.S. Patent No. 2,491,709, issued December 20, 1949, to Briggs et al.

There are a wide variety of chemical blowing agents disclosed in the prior art which have been successfully used for expanding polyvinylchloride and other resinous materials. These include dinitrosopentamethylene tetramine, diazoamino benzene, phenylhydrazines, azo dinitriles, carbonates, aryl azo sulfones, urea, biuret, di-N-nitroso piperazine, and many others. The gaseous decomposition products of these various blowing agents vary with the chemical structure of the agent. We have found that blowing agents which evolve nitrogen upon thermal decomposition are especially suitable in the preparation of expanded cellular material to be used as electrical insulation.

Figure 1 illustrates the apparatus of our invention with which the cellular plastic insulated wire has been successfully manufactured. In this figure, 10 designates the discharge head of a suitable extruder mechanism. The details of the extruder form no part of the present invention and the extruder may be of any conventional or suitable type which is commonly used for the extrusion of thermoplastic materials. Such a device characteristically includes a steam or electrically heated rotary auger of varying diameter with respect to its casing. The auger usually has a section at the intake end of constant diameter followed by a section of increasing diameter which is known as the compression section. This is characteristically followed, in turn, by a metering section which is again of constant diameter but larger than the diameter at the intake. Following the metering section there is frequently located a torpedo head whose outside diameter is almost as large as the inner diameter of the jacket thus forcing the molten, thermoplastic material through a very confined area. A die having a bore of suitable configuration is located after the torpedo head through which the thermoplastic material is extruded in the desired shape.

In Figure 1, 12 represents the die depicted as having a tapered bore and being mounted in a suitable die holder 11. A pressure chamber 15 is mounted in direct contact with die holder 11 and is secured rigidly in position by bolts 17 and 17' which pass through flange 16 of the pressure chamber and are anchored in head 10 of the extruder. Materials emerging from the die are extruded directly into the pressure chamber 15 which has a water inlet 18 at one end near the die holder 11 and an extension 19 of reduced cross-sectional area at the remote end. Extension 19 is provided with screw threads 20 for at least a portion of its extent. An O-ring 21 resting in a suitable recess on the end of the pressure chamber in contact with the die holder 11 provides a water-proof seal at that connection.

The extension 19 of the pressure chamber has a short narrow neck 22 which is still further reduced in cross-sectional area from that of the extension. An open-ended jacket 26 slidingly telescopes the neck 22 and contains a series of alternate rubber washers 27 and metal washers 28. The metal washers, one of which is shown in cross section in Figure 2, are provided with outwardly directed opposing flanges 29 and 29'; each flange being in direct contact with an adjacent rubber washer 27, shown in Figure 3. The inner end of neck 22 is in abutting relation with the bank of washers 27, 28. Washers 27 and 28 and jacket 26 in the aggregate form a labyrinth seal, designated generally at 25, the operation of which will be more particularly hereinafter described. An outer encasement 23 with internal threads at one end is moveably mounted on the threaded extension 19.

The operation of the device is as follows: The extruder is charged with a solid mixture consisting primarily of polyvinylchloride, or other thermoplastic resin, and a suitable plasticizer, and containing a blowing agent, and other additives which may be desired. While this mixture, commonly called a plastisol, is traveling through the extruder which is heated, the blowing agent undergoes thermal decomposition and evolves a gas that foams the plastisol. The resultant foam is delivered to the extruder head 10 under pressure. A bare electrical conductor or wire 14 from a suitably positioned drum 13 enters the extruder head in a position generally normal to the longitudinal axis of the extruder mechanism. The wire 14 is so positioned that it passes through the tapered bore of the die 12 at the center thereof. When the extruder is operating, the plastic foam is extruded through the die 12 and the wire 14 thus emerges from the die into the pressure chamber 15 with a coating of expanded cellular plastic material completely encircling it. Water or other suitable fluid medium is pumped into the interior of the pressure chamber under pressure via inlet 18. The water pressure in the chamber prevents the gaseous components of the cellular plastic coating from escaping before the plastic has had an opportunity to gel or set. The coated wire passes through the pressure chamber 15 and into the labyrinth seal 25 from which it emerges via the orifice 24 in the encasement 23. Upon emergence from the cell, the coated wire may be passed through a cooling trough of water (not shown) and wound upon a suitably positioned drum 32 for storage.

The diameters of the central perforations in rubber washers 27 may be adjusted such that the rubber washers actually touch the coated wire as it passes through the seal or are spaced a short distance therefrom. This adjustment is accomplished by rotating the outer encasement 23 on screw threads 20. As viewed in Figure 1, lateral movement of encasement 23 to the left will press the washers 27 and 28 into tighter contact due to the abutment of the end of the neck 22 with the inner washer. Since contact of the rubber washers with the metal washers 28 takes place first through flanges 29 and 29' near the outer periphery of the rubber washers, compression of all the washers tends to deflect the rubber washers inwardly by reducing the diameters of their central perforations. In actual practice, it may be desirable to so position the encasement 23 laterally on the extension 19 that the internal perforations of rubber washers 27 are actually spaced a short distance from the surface of the coated wire. This permits passage of the coated wire through the seal 25 without deformation or damage to the coating of insulation 31. When the encasement 23 and the washers 27 are adjusted in this manner, the labyrinth seal will not operate to prevent escape of at least some of the water through orifice 24. However, by its very nature the seal will not permit large quantities of water to pass through it in short periods, and suitable adjustment of the water pressure at inlet 18 will easily maintain sufficient pressure within chamber 15 to prevent the expanded cellular plastice from collapsing before it has had an opportunity to set.

A sample formulation which has been successfully used with the apparatus of the present invention for the preparation of cellular vinyl coated wire is as follows: polyvinylchloride—100 parts, N,N'-dimethyl N,N'-dinitroso terephthalamide in paraffinic hydrocarbon oil (70/30)—15 parts, dioctyl phthalate—30 parts, toluene—30 parts, tribasic lead sulfate—10 parts. The formulation is fed to the extruder where it is foamed by thermal decomposition of the N,N'-dimethyl N,N'-dinitroso terephthalamide before entering the extruder head 10.

The product which is accomplished by the apparatus illustrated in the attached drawings is a wire coated with an insulating material which consists essentially of closed-cell expanded cellular polyvinylchloride or other plastic material. Incorporation in the plastisol of suitable pigments, antioxidants, and the like will provide the insulation with desired physical properties. The insulating properties of this coating compare very favorably with those of other insulation materials described in the prior art. It will, however, be much cheaper than most of the prior art materials inasmuch as the resin is greatly extended by a substantial percentage of gas cells. By means of the present apparatus, it is possible to provide a wire with a coating of insulation material containing as little as 25 percent by volume of the solid polyvinylchloride or other resin. Inasmuch as the gaseous components of the coating, for example nitrogen, will themselves have excellent insulation properties, the coating will not only be extremely favorable from an economic standpoint but will also have excellent dielectric properties. An enlarged cross-sectional view of the final product is illustrated in Figure 4.

Any suitable plasticizer may be used for formation of the plastisol. If the resin is polyvinylchloride, such plasticizers are tricresyl phosphate, dioctyl phthalate, dioctyl sebacate, dioctyl adipate, polypropylene glycol esters, chlorinated paraffins, chlorinated aromatics, e.g., chlorinated polyphenyls, and the like may be used.

Suitable stabilizers for polyvinylchloride may also be used to enhance the polymer's stability to light and heat. Organic and inorganic lead salts, e.g., dibasic lead phthalate and tribasic lead sulfate, metallic soaps, e.g., barium calcium laurate, epoxy compounds, e.g., diglycidyl ether or butyl epoxy stearate, and organometallic complexes are exemplary of such stabilizers. These additives have little or no effect on the operation of the apparatus.

The invention has been described with particular reference to the production of wire insulated with expanded cellular polyvinylchloride, since this expanded resin has been demonstrated to be especially suitable for such purposes. The invention, however, is operable with a wide variety of organic resins and elastomers and is limited only in the ability of any resin or elastomer to undergo expansion by the thermal decomposition of a chemical blowing agent.

The apparatus is readily adaptable to the production of rods, tubes, and sheets of the expanded cellular plastic. For such purposes, the electric wire will be eliminated, but the plastisol will still be extruded, through a suitable die, directly into pressure chamber 15. The seal 25 may be suitably modified to conform to the configuration of the extruded cellular plastic.

Having thus described a typical embodiment of our invention it will be readily apparent that the underlying principles herein disclosed may be embodied in any other organization or arrangement differing widely from those illustrated without departing from the spirit of the invention. We, therefore, intend to be limited only by the following claims.

We claim:

1. A device for the manufacture of electrical conductors having a coating of expanded cellular plastic material comprising an extruder for a thermoplastic material into which has been incorporated a chemical blowing agent, a die at the discharge end of said extruder, means for continuously conducting an elongated electrical conductor into the discharge end of said extruder and out of said discharge end through said die in order to provide the conductor with a coating of expanded cellular thermoplastic material, a pressure chamber adjacent to said die into which the coated electrical conductor passes upon emergence from the die, said pressure chamber having external screw threads along a portion of its outer surface remote from the die, intake means in the pressure chamber for delivering cool fluid under pressure to the interior thereof, and a seal at the remote end of the pressure chamber through which the coated conductor is discharged without dissipating the fluid pressure in the pressure chamber, said seal including an open-ended outer encasement having internal screw threads at one end in adjustable threaded engagement with the external screw threads on the end of the pressure chamber, a jacket member having a configuration comparable to that of the outer encasement but of smaller dimensions retained in slidable engagement with the interior surface of said outer encasement, a series of alternately elastomeric and rigid centrally-perforated washers in slidable engagement with the interior of said jacket member, the rigid washers of said series having peripheral flanges protruding laterally from both faces thereof and in contact with adjacent elastomeric washers, the innermost washer of said series being in contact with an abutting neck portion of the pressure chamber which protrudes into and is in slidable engagement with the interior surface of the jacket member, whereby rotation of the outer encasement will increase the compressive forces on the series of washers and cause the central perforations of the elastomeric washers in the series to deflect inwardly and thus adjust the effective diameter of the perforation.

2. A device for the continuous manufacture of expanded cellular polymeric materials in elongated configurations comprising a continuous extruder adapted to receive a polymer-blowing agent mix and to extrude the foamed polymer which is formed by thermal decomposition of the blowing agent, a die at the discharge end of said extruder, an elongated pressure chamber adjacent the outer face of said die into which the foamed polymer is extruded, said pressure chamber having external screw threads along a portion of its outer surface remote from the die, intake means in the pressure chamber for delivering a cool fluid medium under pressure to the interior thereof, said cool fluid medium under pressure serving to gel the molten polymer in the foamed state, and a labyrinth seal operatively connected to the outer end of the pressure chamber to permit discharge of the expanded cellular polymeric product while holding escape of the fluid medium under pressure to a controlled minimum, said labyrinth seal including an open-ended outer encasement having internal screw threads at one end in adjustable threaded engagement with the external screw threads on the end of the pressure chamber, a jacket member having a configuration comparable to that of the outer encasement but of smaller dimensions retained in slidable engagement with the interior surface of said outer encasement, a series of alternately elastomeric and rigid, centrally-perforated washers in slidable engagement with the interior of said jacket member, the rigid washers of said series having peripheral flanges protruding laterally from both faces thereof and in contact with adjacent elastomeric washers, the innermost washer of said series being in contact with an abutting neck portion of the pressure chamber which protrudes into and is in slidable engagement with the interior surface of the jacket member, whereby rotation of the outer encasement will increase the compressive forces on the series of washers and cause the central perforations of the elastomeric washers in the series to deflect inwardly and thus adjust the effective diameter of the perforation.

3. A device for the manufacture of electrical conductors having a coating of expanded cellular plastic material comprising an extruder for a thermoplastic material into which has been incorporated a chemical blowing agent, a die at the discharge end of said extruder, means for continuously conducting an elongated electrical conductor into the discharge end of said extruder and out of said discharge end through said die, in order to provide the conductor with a coating of expanded cellular thermoplastic material, a pressure chamber adjacent to said die into which the coated electrical conductor passes upon emergence from the die, intake means in the pressure chamber for delivering a cool fluid under pressure to the interior thereof, and a seal at the remote end of the pressure chamber having a central aperture which is radially adjustable through which the coated conductor is discharged without dissipating the fluid pressure in the pressure chamber, said radial adjustment permitting regulation at all times of the distance between the coated electrical conductor and the components of the seal encircling same.

References Cited in the file of this patent

UNITED STATES PATENTS

| | | |
|---|---|---|
| 1,689,206 | Lamplough | Oct. 30, 1928 |
| 2,023,665 | Clayton | Dec. 10, 1935 |
| 2,571,560 | Gall | Oct. 16, 1951 |
| 2,642,622 | Jones | June 23, 1953 |
| 2,733,939 | Scherer | Feb. 7, 1956 |
| 2,766,481 | Henning | Oct. 16, 1958 |
| 2,832,993 | Cox | May 6, 1958 |

FOREIGN PATENTS

| | | |
|---|---|---|
| 839,092 | Germany | May 15, 1952 |